April 29, 1958

B. J. FARROW 2,832,247

SCREW-CUTTING LATHES

Filed Feb. 11, 1954

INVENTOR

BENJAMIN J. FARROW

BY Young Emery
& Thompson

ATTORNEYS

April 29, 1958 B. J. FARROW 2,832,247
SCREW-CUTTING LATHES
Filed Feb. 11, 1954 5 Sheets-Sheet 2
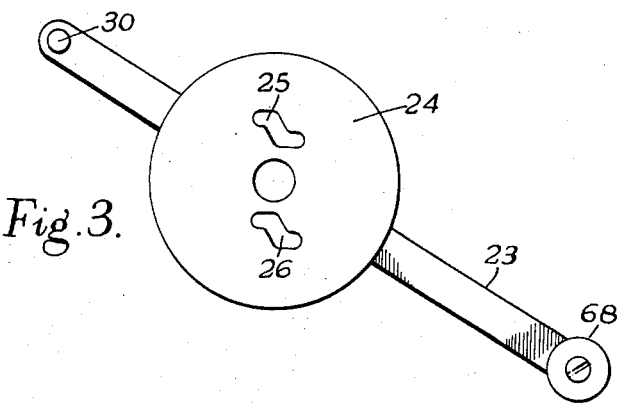
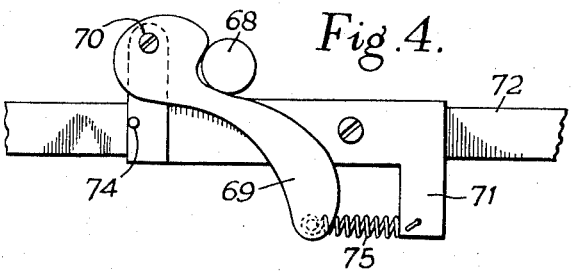
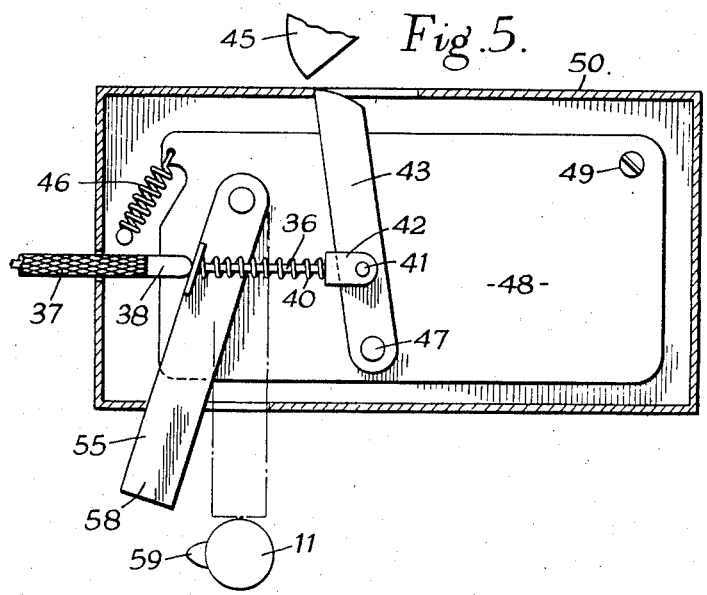
INVENTOR
BENJAMIN J. FARROW
BY Young, Emery
& Thompson
ATTORNEYS April 29, 1958     B. J. FARROW     2,832,247
SCREW-CUTTING LATHES Filed Feb. 11, 1954     5 Sheets-Sheet 3

INVENTOR
BENJAMIN J. FARROW
BY Young, Emery
Thompson
ATTORNEYS

April 29, 1958

B. J. FARROW 2,832,247

SCREW-CUTTING LATHES

Filed Feb. 11, 1954

BENJAMIN JOHN FARROW
INVENTOR
by Irwin S. Thompson
ATTORNEY

United States Patent Office 2,832,247
Patented Apr. 29, 1958

2,832,247

SCREW-CUTTING LATHES

Benjamin John Farrow, Cranborne, Wimborne, England

Application February 11, 1954, Serial No. 409,623

Claims priority, application Great Britain February 11, 1953

4 Claims. (Cl. 82—23)

This invention relates to screw cutting lathes and its main object is to provide apparatus whereby successive cuts can be commenced at the appropriate moments whereby screws can be cut with rapid operation. The apparatus can be built in as a normal part of a lathe or may be designed as an attachment to an existing lathe.

Screw cutting lathes are usually provided with a mandrel or headstock spindle for rotating the work, a lead screw, a carriage which carries the tool, and a carriage device (for example a half-nut) to be operated at a moment of recurrence of a given relative position of the mandrel or headstock spindle and lead screw for engaging the carriage with the lead screw.

According to the present invention we provide an apparatus for such lathes comprising a mandrel or headstock spindle, a lead screw, a carriage, a carriage device to be operated at a moment of recurrence of a given relative position of the mandrel or headstock spindle and lead screw, for engaging the carriage with the lead screw, and two control elements operatively connected respectively with the mandrel or headstock spindle and the lead screw; comprising means including two contact surfaces which surfaces are adapted for operation by said two control elements respectively, said means being operated when said contact surfaces are acted on simultaneously by said two control elements thereby ascertaining the moment of recurrence of relative position.

The two control surfaces will be set in relation to the two control elements so that they have a definite relative position on starting the first cut. The second and successive cuts will then be commenced at the moment when said control elements simultaneously operate said two surfaces. The operation of said surfaces may effect the engagement of the carriage automatically, or may permit engagement by hand, and/or may provide audible or visual indication when such engagement is to be effected by hand.

The invention will now be more fully described by way of example with reference to the accompanying diagrammatic drawings wherein:

Figure 3 is a front elevation of a detail to be described;

Figure 4 is a front view of a release device;

Figures 5 and 6 are views similar to Figures 1 and 2 but showing a modified construction;

Figure 1:
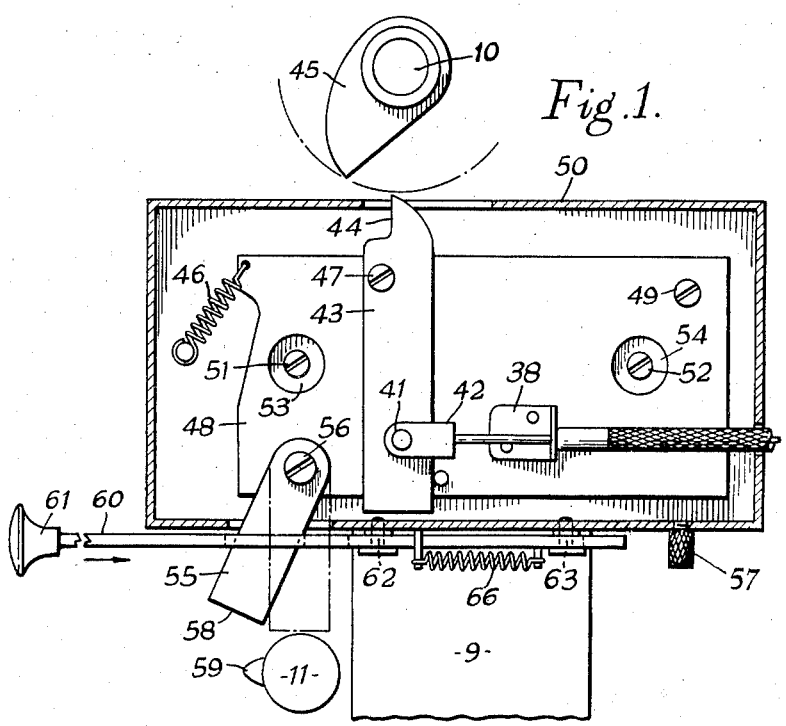
Figure 1 is an end elevation, partly in section of part of a screw-cutting lathe and an apparatus attached thereto made in accordance with the invention.

Referring first to Figures 1 to 4, and 9 the lathe comprises a lathe bed 9, headstock 5, a mandrel (i. e. headstock spindle) 10, a lead screw 11, and an apron 12 which is detachably connected to the usual carriage 5 and in effect comprises part of the carriage. The apron carries a pair of half-nuts 14, 15 mounted slidably in guideways 16, 17 so that they can be moved towards each other to engage the lead screw between them at the moment when the cut is to be commenced, and can be moved apart at the end of the cut. A rod 18 passes through the half nuts and has a head 19 at one end and a spring 20 held by a nut 21 at the other end whereby the half nuts are urged towards each other. The apron carries a stud 22 on which is pivotally mounted an engagement lever 23 and a cam plate 24 that is fixed to the lever 23. The cam plate has two cam slots 25, 26 engaged by pins 27, 28 on the half nuts. These cam slots maintain the nuts firmly when they are in their fully opened and fully closed positions. One end of the lever 23 carries a stud 30 that projects through a slot 31 in the apron and is loaded by a spring 32 towards its engagement position. An angle lever 34 is pivoted on the apron at 35 and has one arm attached to one end of the inner cable 36 of a Bowden wire device, the outer sheath 37 of which carries suitable stops 38 (Figure 1), 39 (Figure 2) and is loaded by spring 40. When the lever 34 is rotated by the cable 36, its other arm moves the stud 30 to effect rotation of the lever 23 and the spring 20 effects engagement of the half nuts on the lead screw.

The Bowden cable passes under the lathe bed 9 and upwards across the rear of the lathe (Figure 9) to the rear of the headstock 5 where the inner cable 36 is attached pivotally at 41 by a connector 42 to a contact surface member or trip member 43 which has a contact surface 44 adapted to be engaged at the appropriate moment by a control element or trigger 45 carried by the mandrel 10. The Bowden cable is long enough to allow for the maximum spacing of the lathe apron from the headstock. As the apron moves towards the headstock, the Bowden cable merely bends into a loop at the rear of the lathe without affecting the action of the cable.

The trip member 43 is pivotally attached at 47 to a movable member or latch plate 48 that has a return spring 46 and is pivotally mounted at 49 on a support in the form of a casing 50 that is fixed (when made as an attachment) to the lathe by screws 51, 52 which can be reached through holes 53, 54 in the plate 48.

Pivotally carried at 56 by the plate 48 is a second contact surface member 55, that has a contact surface 58 engageable by a control element or cam 59 on the lead screw 11.

A slide 60 having an operating knob 61 has a slot engaged by guiding studs 62, 63 and has a slot through which the member 55 projects. The slide is urged to its normal position as shown by a spring 66.

A screw 57 restricts the travel of the slide 60 to position the member 55 for right-hand threading. With the stop-screw removed the slide can be pushed in further for left-hand threading, for which purpose slots are provided in the slide to accommodate the screws 62, 63.

The operator proceeds as follows:

Assuming that the required gearing has been selected between the mandrel or spindle 10 and lead screw 11 in the usual way, the operator first temporarily disengages the mandrel or spindle 10 from the lead screw, and turns the lead screw until the control element 59 is at its top position where it can contact the surface 58. He also turns the mandrel or spindle 10 until the control element 45 is in position to contact the surface 44. The gearing is then connected between the mandrel or spindle 10 and lead screw 11. He now brings the carriage away from the work towards the tailstock (for a right-hand thread) and engages the half nuts 14, 15 with the lead screw 11. The tailstock is then brought up to contact the carriage and locked in position so as to provide a locating stop. The half nuts are then disengaged from the lead screw and held in this position against the action of the springs 20, 32 by engagement of the pins 27, 28 in the ends of the slots 25, 26. The drive is started so as to rotate the mandrel or spindle 10 and lead screw. After adjusting the tool for the required depth of cut, the operator presses the knob 61 and holds the slide 60 in with the surface 58 disposed above the lead screw 11. At each rotation of the lead screw the cam 59 will raise the parts 55, 48, 43. When this coincides with the control element 45 simultaneously reaching the surface 44 this surface is moved thereby pulling the pins 27, 28 out of the ends of the slots 25, 26 which allows the springs 20 and 32 to engage the half nuts on the lead screw through the connections 43, 36, 34, 23, 24, 27, 28 to start the screw cutting. The operator then releases the knob 61 and the slide 60 is returned by the spring 66.

At the end of the cut the operator withdraws the tool, returns the carriage, feeds the tool for further depth of cut, and again presses the knob 61. When the control elements 45, 59 again simultaneously contact the surfaces 44, 58, the half nuts will again engage the lead screw whereby the next cut is commenced at the exact position where the first cut was started.

For automatically disengaging the half nuts from the lead screw 11 at the ends of successive cuts, the engagement lever 23 carries an anti-friction roller 68 which engages an arm 69 that is pivoted at 70 on a bracket 71 mounted on a rail 72 attached to the lathe bed 9. The arm 69 is forced back to a stop pin 74 against the action of a spring 75. The roller 68 then runs down the arm 69 thereby rotating the arm 23 and disengaging the half nuts from the lead screw.

Figure 6:
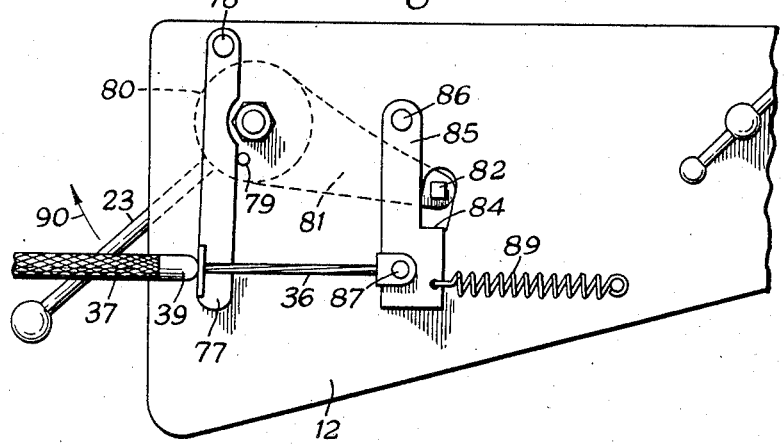

Referring now to Figures 5 and 6, the member 43 has its connection 41 to the cable 36 between its upper end and its pivot 47 which is now at its lower end, and the spring 40 now acts between parts 42 and 38. The stop 38 engages the member 55. The stop 39 engages a lever 77 that is pivoted at 78 on the apron and is engageable by a pin 79 carried by a plate 80 attached to the engagement lever 23. A lever 81 is also attached to the engagement lever 23 and carries a stop pin 82 that normally is spaced a short distance from a stop shoulder 84 on a lever 85 that is pivoted at 86 to the apron and is attached at 87 to the cable 36. A return spring 89 acts on the lever 85.

Figure 2:
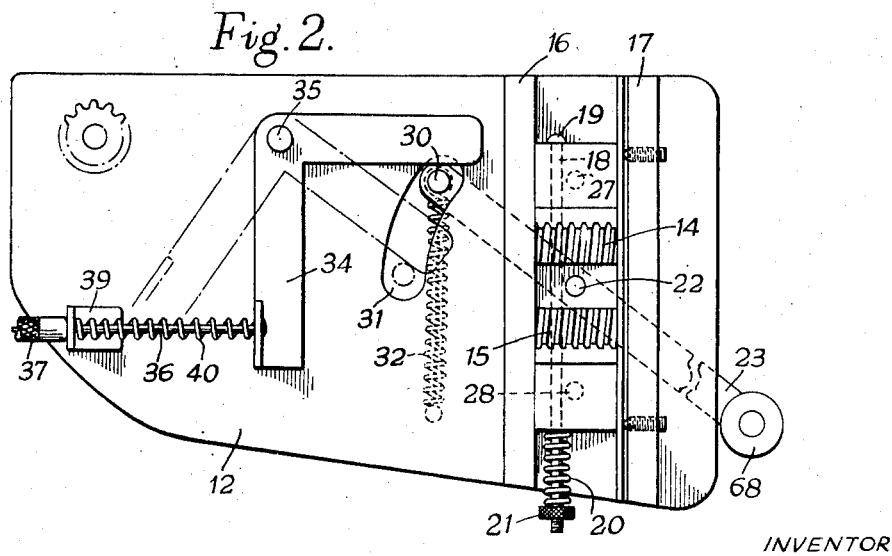
Figure 2 is a rear view of the apron of the lathe (i. e. looking in a direction at right angles to Figure 1) embodying parts made in accordance with the invention.

In operation, when the cut is to be commenced, the operator moves the engagement lever 23 in the direction of the arrow 90 until the stop pin 82 is arrested by the shoulder 84 at which moment the cable sheath 37 will have moved the member 55 to bring the contact surface 58 over the lead screw 11. The operator maintains pressure on the lever 23, and when the control members 59, 45 simultaneously contact the surfaces 58, 44, the trip 43 will swing over and pull the cable 36 so as to pull the lever 85 to bring its shoulder 84 out of the path of the stop pin 82 whereupon the pressure of the operator maintained on the lever 23 will move it to engage the half nuts with the lead screw. The connections between the half nuts and the lever 23 may be about as shown in Figure 2 or as shown in co-pending United States patent application No. 415,129, now Patent No. 2,756,623.

Figure 7:
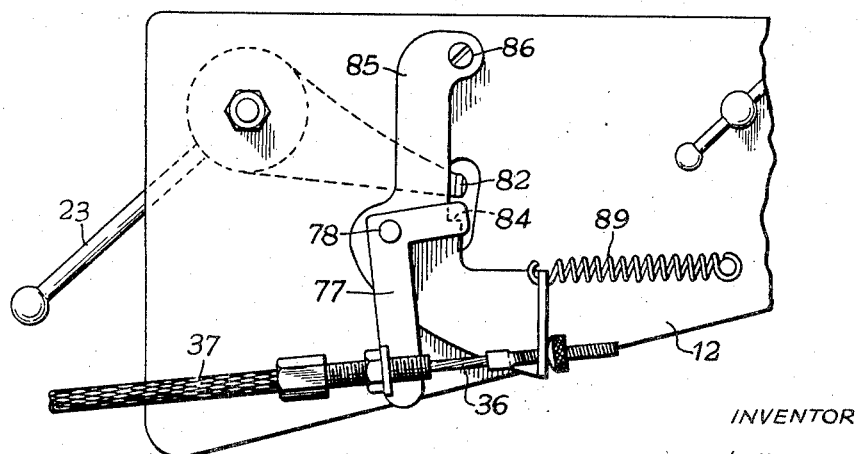
Figure 7 is similar to Figure 6 but shows a modified construction.

The modified construction shown in Figure 7 is very similar to that shown in Figure 6, but the lever 77 in this case is pivoted at 78 on the lever 85.

Figure 8:
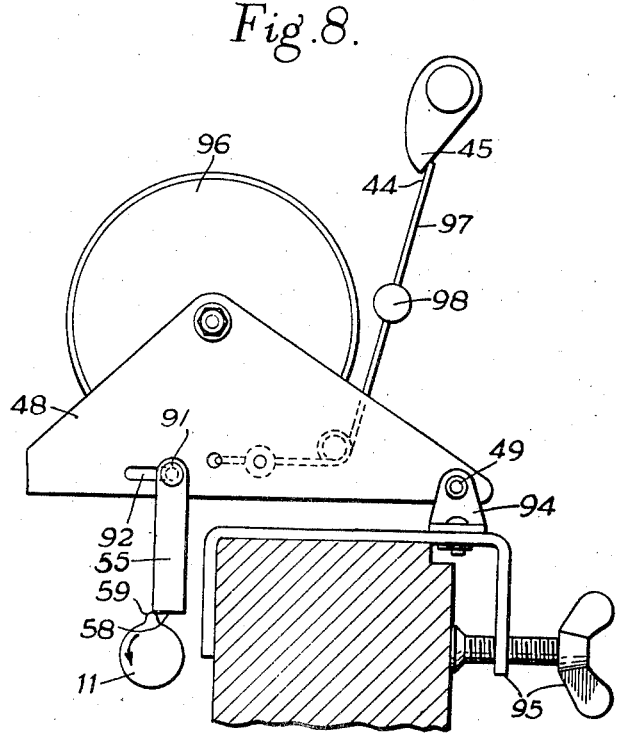
Figure 8 is a view similar to Figure 1 but showing a third constructional form of the invention.
Figure 9:
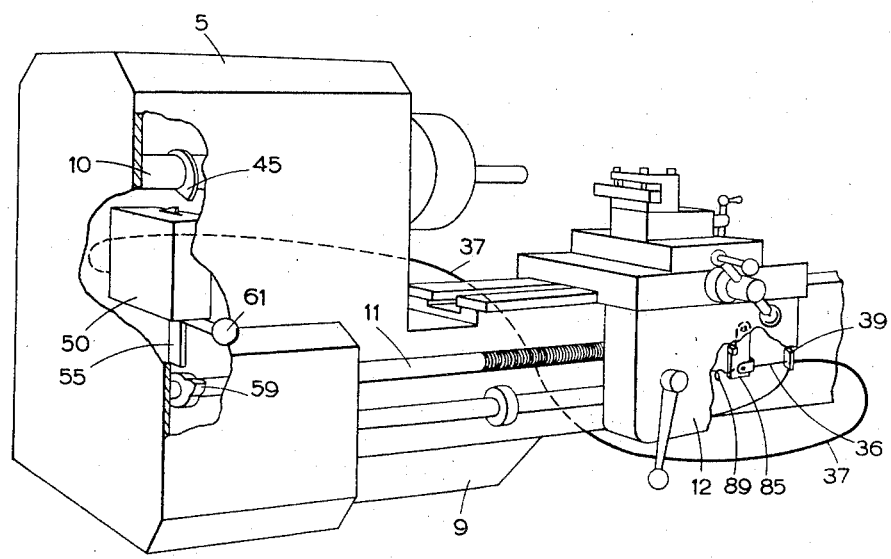
Figure 9 is a perspective view showing where the parts of Figures 1 and 2 are mounted on a lathe.

In the modification shown in Figure 8 the member 55 is slidable horizontally in the plate 48 by means of a pin 91 and slot 92. The plate 48 is pivoted at 49 to a bracket 94 that is attached to the lathe by a clamp 95. The plate 48 carries a bell 96 and a spring arm 97 on which is a striker knob 98. The upper end of the spring arm 97 has the contact surface 44 which is engaged by the control member 45 so that the bell rings on each recurrence of the predetermined relative positions of the mandrel or spindle 10 and lead screw and gives an audible and visual indication to the operator who can then start the cut by hand operation of the lever 23.

If desired the member 55 may be attached to the member 48 by a thumb-screw and thereby adjustable laterally to allow for right-hand or left-hand threads. In right-hand threading the lead screw rotates clockwise viewed from the tailstock; in left-hand threading anti-clockwise. The adjustment may be such as to bring the leading edge 100 of the member 55 in line with the vertical centre line through the lead screw for right-hand threads to effect rapid drop off the cam 59, so reducing to a minimum the operative arc of the mandrel or spindle 10 trigger 45 and increasing the selectivity of the device. For left-hand threads, the following edge 101 will come into line with said centre line.

The Bowden cables may be provided with cable adjusting devices.

If desired the device as shown in Figure 1 can be used in conjunction with the apparatus shown in the specification of United States patent application No. 415,129, now Patent No. 2,756,623 issued June 10, 1957, a lever such as 85 and a pin such as 82 being incorporated in the latter.

I claim:

1. Apparatus for use with a screw-cutting lathe having headstock spindle, a lead screw, a carriage, and having a first projection on the lead screw and a second projection on the spindle, said apparatus comprising an apron to be mounted on said carriage, a half-nut device mounted on the apron, which device requires to be operated only at a moment of recurrence of a given relative position of the spindle and lead screw for engaging the carriage with the lead screw, spring means carried by the apron and urging the half-nut device towards engagement with the lead screw, cam means mounted on the apron for moving the half-nut device away from the lead screw and holding it off the lead screw, actuating means mounted on the apron for actuating the cam means, a casing to be mounted on the lathe, a first contact element, a movable member movably carried by said casing and carrying said first contact element and is moved thereby, said first contact element being engageable and periodically momentarily displaced by said first projection, a second contact element also carried by said movable member and located in such position that it is movable momentarily into the path of movement of said second projection when the movable member is moved by displacement of the first contact element, a spring constantly urging said movable member to bring said second contact element out of the path of said second projection, another spring constantly urging said first contact element out of the path of said first projection, and means connecting the second contact element with the means for actuating the cam means.

2. Apparatus for use with a screw-cutting lathe having a headstock spindle, a lead screw, a carriage, a carriage device carried by the carriage and engageable with the lead screw, said device being required to be operated only at a moment of recurrence of a given relative position of the spindle and lead screw for engaging the carriage with the lead screw, a first projection connected to the lead screw for rotation thereby, and a second projection connected to the spindle for rotation thereby, said apparatus comprising an apron adapted to be mounted on the carriage, a casing adapted to be mounted on the lathe fixed in relation to the headstock, a first contact element, a movable member movably carried by the casing and carrying said first contact element and is moved thereby, said first contact element being engageable and periodically momentarily displaced by said first projection, a second contact element also carried by said movable member and located in such position that it is movable momentarily into the path of movement of said second projection when the first contact element is displaced, a spring constantly urging said movable member to bring the second contact element out of the path of the second projection, another spring constantly urging said first contact element out of the path of the first projection, a hand-operable member mounted on the apron for moving the carriage device to the engagement position, a stop for stopping said hand-operable member after it has been moved towards its engagement position but before engagement is effected, connections between said hand-operable member and said first contact element to bring it into the path of movement of said first projection when the hand-operable member has moved to its stopped position, and connections between the stop and the second contact element whereby the latter when actuated by the projection associated therewith moves the stop to permit continued engagement movement of said hand-operable member.

3. Apparatus for use with a screw-cutting lathe having a headstock spindle, a lead screw, a carriage, a carriage device carried by the carriage and engageable with the lead screw, said device being required to be operated only at a moment of recurrence of a given relative position of the spindle and lead screw for engaging the carriage with the lead screw, a first projection connected to the lead screw for rotation thereby, a second projection connected to the spindle for rotation thereby, said apparatus comprising an apron adapted to be mounted on the carriage, a casing adapted to be mounted on the lathe fixed in relation to the headstock, a first contact element, a movable member which is carried movably by the casing and which carries said first contact element and is moved thereby, said first contact element being engageable and periodically momentarily displaced by said first projection, a second contact element also carried by said movable member and located in such position that it is movable momentarily into the path of movement of said second projection when the first contact element is displaced, a hand-operable member mounted on the apron for moving the carriage device to the engaged position, a stop for stopping the hand-operable member after it has been moved towards its engagement position but before engagement is effected, and connections between said stop and the second contact element whereby the latter when actuated by the projection associated therewith moves the stop to permit continued engagement movement of said hand-operable member.

4. Apparatus for use with a screw-cutting lathe having a headstock spindle, a lead screw, a carriage, a carriage device to be operated only at a moment of recurrence of a given relative position of the spindle and lead screw for engaging the carriage with the lead screw, a first projection on the lead screw, and a second projection on the spindle, said apparatus comprising a first contact surface engageable and periodically momentarily displaced by the first projection, a movable member, first mounting means for mounting said first contact surface movably on the movable member for permitting movement of said first contact surface normally to a position out of the path of movement of the first projection, and for permitting movement of said first contact surface into the path of the first projection when screw cutting is desired, a second contact surface also carried by said movable member and located in such position that it is moved momentarily into the path of movement of the second projection when the first contact surface is displaced thereby ascertaining the moment of recurrence of said relative position, a support, second mounting means for mounting said movable member on the support for movement of the movable member normally to a position in which the second contact surface is out of the path of movement of said second projection, a first spring arranged to constantly urge said first contact surface out of the path of the first projection, and a second spring arranged to constantly urge said second contact surface out of the path of the second projection.

References Cited in the file of this patent

UNITED STATES PATENTS

| | | |
|---|---|---|
| 558,713 | Bloemker | Apr. 21, 1896 |
| 728,928 | Japs | May 26, 1903 |
| 1,775,737 | Schaerer | Sept. 16, 1930 |
| 1,902,657 | Merwin | Mar. 21, 1933 |

FOREIGN PATENTS

| | | |
|---|---|---|
| 393,019 | Germany | Mar. 28, 1924 |
| 560,313 | France | Oct. 2, 1923 |